March 26, 1963 C. R. KAUFMAN 3,082,682
MEAT COMPRESSING MACHINE FOR ROLLING ROASTS
Filed March 23, 1956 2 Sheets-Sheet 1
Fig. 1
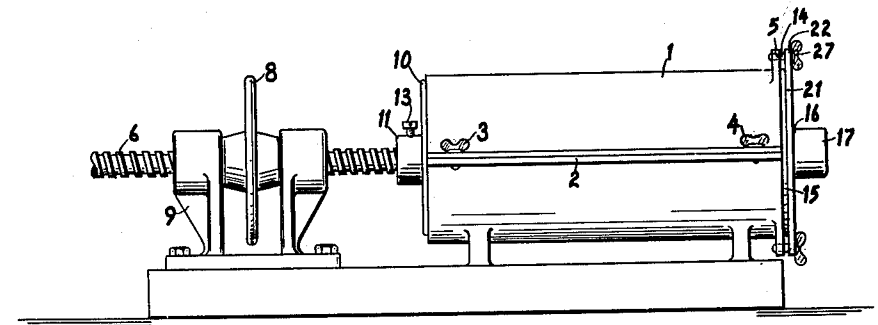
Fig. 2
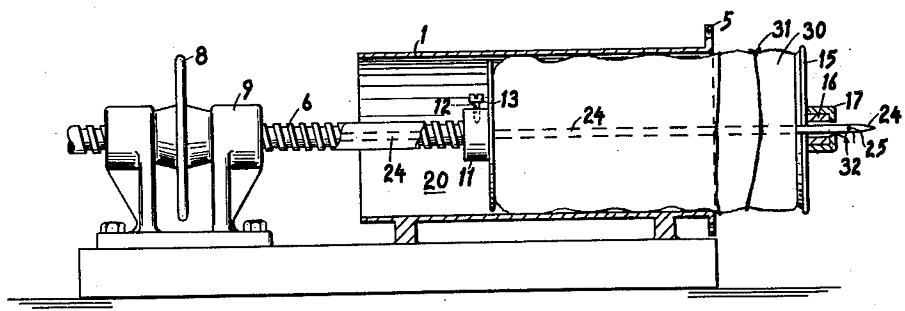
Fig. 3
INVENTOR.
CASSEL RAY KAUFMAN
BY John P. Murphy
ATTORNEY

MEAT COMPRESSING MACHINE FOR ROLLING ROASTS

Filed March 23, 1956 2 Sheets-Sheet 2

INVENTOR.
CASSEL RAY KAUFMAN
BY
John P. Murphy
ATTORNEY

United States Patent Office 3,082,682

Patented Mar. 26, 1963

3,082,682

MEAT COMPRESSING MACHINE FOR ROLLING ROASTS

Cassel Ray Kaufman, Port Byron, N.Y.

Filed Mar. 23, 1956, Ser. No. 573,580
2 Claims. (Cl. 100—3)

This invention relates to a meat rolling machine for roasts, and in particular to a meat compressing machine which is so devised that it may be used with various types of meat for forming a roast.

In previous machines of this type, which in some cases may have been automatic, the work was limited to rolling rib roasts only. Other cuts of meat were unable to be rolled in this type of machine because of its unsuitable structure. As a result of this it was necessary to roll a piece of meat, other than a rib roast, manually, by placing the meat around a pin or needle and winding the meat carefully around so that a presentable roll of meat was formed. The ends of the rolled meat then had to be tucked in before the operator was able to tie a cord or string around the rolled meat to hold it in shape, then fastening the cord securely. By this method of rolling meat for roasts, an unevenly shaped roast was formed the majority of time. Heretofore, the meat rolling machines were unable to do any of this successfully and neatly.

The main object of this invention is to provide a meat compressing machine for forming a roast, which may be manually operated or power actuated, whereby various meats such as beef, veal, pork, etc., may be easily compressed into a uniform roast. This type of compressing machine for forming roasts does not limit the meat to certain types or cuts.

Another object of this invention is to provide a meat compressing machine which compresses meat placed therein, forming a neater, more uniformly shaped roast. Two or more pieces may be placed inside, and by a single operation, a solidly compressed roast is had. The fact that the roast is uniformly pressed throughout in width is very important, inasmuch as this allows for an even cooking of the meat.

Another advantage of this meat compressing machine is the accommodating structure which enables one to quickly and easily disassemble the parts so that they may be cleaned after the meat has been compressed, so that the metal parts thereof will not be affected in any way by bacteria from contact with the meat.

Another important advantage of this machine is the ease with which the machine may be operated. This type of machine requires no special training of the operator, is easily run, and decreases the time spent in forming roasts from various pieces of meat.

Another object of this novel device is to provide means for passing a cord longitudinally through the meat after it has been compressed, so that the operator may bind the pieces of compressed meat forming the roast lengthwise, as well as circumferentially. In this manner, one is assured of a neat and compact roast, one that will not fall apart, even when two or more cuts of meat make up the roast.

Another advantage of this invention is the fact that after the meat has been compressed into a roast, it is not necessary to trim the edges which so often protrude from a hand orlled roast. This results in a great savings of meat and time.

In accordance with the present invention, a tubular casing is provided in which to place the meat to be compressed. A conventional hinge device or other suitable means enables the opening and closing of the top of the casing. A suitable plate is located on the back end of the casing, with a similar plate located at the front opening of the tubular casing. The front plate is affixed to a threaded tube which passes through a rotatable wheel affixed on a stand, the wheel having its central opening threaded to receive the threaded tube. The threaded tube has a longitudinal opening which allows the passage therethrough of a needle having a knob on one end, and in through the meat compressed in the casing, and then out through the back plate. A clamp arrangement holds the back plate in position with respect to the casing while the meat placed therein is being compressed. Suitable means retain the needle passing through the compressed meat securely in place with respect to the back plate. The stand holding the threaded tube arrangement and the tubular casing is removably positioned and affixed on a suitable base.

To the above objects and others which may appear hereinafter, the invention consists of the novel construction, combination and arrangement of parts as will be more specifically referred to and illustrated in the accompanying drawings wherein is shown an embodiment of the present invention.

In the drawings:

FIGURE 1 is a view of a needle such as is used with respect to this invention.

FIGURE 2 is a side elevation of the machine according to the embodiment of this invention, and showing the relationships of the various parts thereof.

FIGURE 3 is a side view partly in section, further illustrating the features of the machine.

Figure 4:
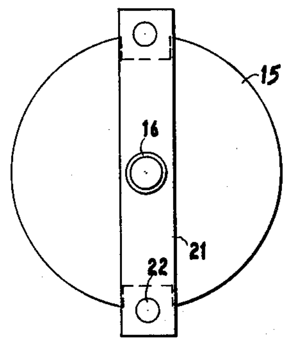
FIGURE 4 is a front view of the back plate and clamp, showing the relationship of one to the other.

With reference to FIGURES 2 and 3, the meat compressing machine comprises a tubular casing 1 having flanges 2 forming part thereof. The top half of the casing 1 has a conventional hinge (not shown) such as a piano-type hinge at the back, being disposed longitudinally and substantially opposite the flanges 2 at the front seam. The flanges 2 have threaded screw holes for receiving screws 3 and 4 for holding the flanges securely fastened together. The casing 1, cylindrical in the embodiment shown, is open at either end, and at the back end thereof are projections or lugs 5, having screw holes 14 therein, which will be more fully explained.

The whole machine is suitably mounted on a base. Also mounted on the base and in longitudinal alignment with the casing 1 is a stand 9 having a hand wheel 8, which wheel 8 has the interior of its hub threaded to receive a threaded tube 6 therethrough. A circular front plate 10 is fastened to the front end of tube 6 by a conventional collar 11 and set screw 13, the screw 13 being received by a threaded hole 12 in collar 11. The collar 11 may be integral with plate 10 or a separate part fastened thereto. Front plate 10 is considerably smaller in diameter than the diameter of the chamber 20 being formed by the inside of casing 1.

Figure 5:
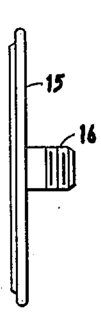
FIGURE 5 is a side elevation of the back plate showing the hub forming a part thereof.
Figure 6:
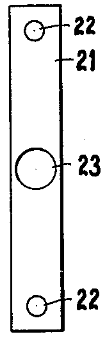
FIGURE 6 illustrates an embodiment of the clamp used with the machine.
Figure 7:
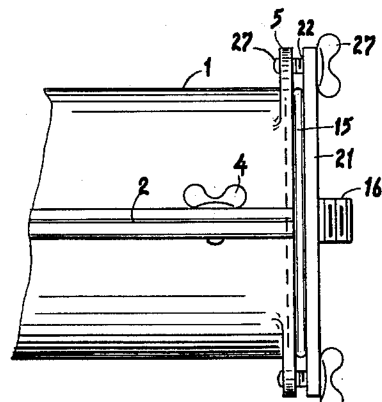
FIGURE 7 is an enlarged side elevation in part, illustrating the means for affixing the back plate to the casing.
Figure 8:
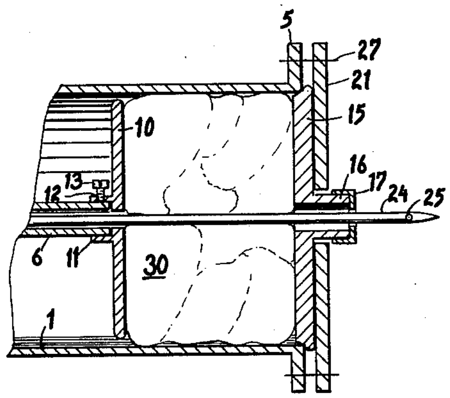
FIGURE 8 is a sectional side view of the machine in part, showing the disposition of the needle through the meat and holding means therefore.

FIGURE 5 illustrates a back plate 15 having a threaded hub 16 formed centrally thereon, the hub 16 being hollow interiorly. As best shown in FIGURES 7 and 8, the plate 15 is fitted over the back end of casing 1 so that a part of the plate extends slightly into the interior of the casing. A clamp 21, FIGURES 4, 6 and 7, having screw holes 22 at the ends thereof and a central hole 23, is adapted to be placed over hub 16 for holding the back plate 15 in place over the end of casing 1. The clamp 21 is held by suitable screws 27 being received through holes 22 into holes 14 in projections 5. It is seen herein that the screws 3, 4 and 27 may conveniently be wingnut type screws, which facilitates easy and convenient use thereof. A cap or knob 17 is threaded interiorly so that it can be screwed over the hub 16 on cap 15. This knob 17 is used to hold the needle 24 in place when it is placed in the meat.

The needle 24 is shown in FIGURE 1 as having an elongated body pointed at one end. Substantially at the pointed end is an eye 25 adapted to receive the end of a piece of cord or twine, indicated at 32 on FIGURE 3, the cord being used for tying a roast. At the opposite end of the needle 24 is a knob or handle 26, best described as an enlarged portion of the end of the needle. The needle 24 is adapted to be placed longitudinally through the threaded tube 6, and into the casing, moving from front to back. The needle first passes through tube 6, front plate 10, the meat being pressed, back plate 15 and hub 16, being finally held in place by knob 17 disposed therearound.

Before beginning operation of the machine it is to be understood that the following assemblage of components of the machine is found. The threaded tube 6 and front plate 10 are in the position shown in FIGURE 2. The back plate 15, clamp 21, screws 27, and knob 17 are not on the machine. Screws 3 and 4 are not yet in place, and the top half or portion of the casing 1 is in the open position (not shown). Since it is well known in the art that the half of the casing 1 being hinged is adapted to be opened, no further illustration is made. As shown in FIGURE 3, a piece or pieces of meat are placed in the chamber 20 of casing 1. The amount of meat placed therein is limited only by the dimensions of casing 1 or by the desired size of the resultant roast. It is therefore obvious that the size of the casing 1 may vary according to the type or size of the roast desired. The top portion of casing 1 is closed, the flanges 2 then being in alignment, and the screws 3 and 4 are placed in the tapped holes in flanges 2 and screwed substantially tightly. The back plate 15 is placed in position with respect to the opening in the back end of casing 1, and the clamp 21 is placed so that the central opening 23 fits over the threaded hub 16 on plate 15. The threaded holes 22 of clamp 21 are aligned with the holes 14 of the projections or lugs 5 of casing 1, and screws 27 are placed therein and screwed substantially tight. Thus the back plate 15 and the clamp 21 are securely affixed to the back end of casing 1.

The operator then turns the hand wheel 8 in the conventional manner, the hand wheel 8 being threaded on the tube in the conventional manner well known in the art. The tube 6 with front plate 10 affixed thereon is thus advanced into casing 1. The front plate 10 is forced against the meat in the chamber 20, compressing this meat against the back plate 15 into the form of the roast 30 shown in FIGURES 3 and 8. The pressure of front plate 10 against the meat prevents the tube 6 from turning with the wheel 8, although well known means such as a guide pin on stand 9 running in a groove (not shown) in the tube 6 may also be used to prevent tube 6 from turning with the wheel 8. When the meat has been compressed to the degree desired, the turning of hand wheel 8 is discontinued. The operator then places the needle 24 in the opening in the tube 6 and forces the needle towards the back of the machine and through the meat 30, FIGURE 3, the needle end ultimately protruding out through the opening in the back plate 15. The direction of the needle through the roast is guided by the tube 6. Knob 17 is then threaded on the hub 16 of back plate 15, thus securely holding the needle and the back plate with respect to the compressed roast therein. It is seen that the holding of the roast is highly important. Herein appears another advantage of this machine. A roast is compressed so that the degree of compression of the meat controls to some extent the amount of cooking required in respect to oven temperature and time. Thus the holding of the compression of the roast by the knob 17 is an important factor in presenting a finished roast from the machine.

The screws 27 are removed, and the clamp 21 is removed from the machine, leaving the back plate 15 free to be removed except that it is held against the roast 30 by the knob 17, as hereinabove described. The hand wheel 8 is then rotated again, slowly forcing the meat out of the casing 1, the meat still being held in the desired shape by the back plate 15 being held by the knob 17 and the needle 24. The operator then turns the wheel, forcing the roast out of the casing a short distance. The roast is then bound in the conventional manner as at 31 in FIGURE 3. Each time that the roast is forced a short way from the casing, another binding is placed around the roast, thus maintaining the desired shape of the roast as formed by the chamber of the casing.

In the case that the roast is formed from two or more pieces of meat, it is advantageous to also bind the roast longitudinally, as well as circumferentially. In FIGURE 3 it is seen that the end of a piece of cord 32 has been placed in the eye 25 of needle 24 before the needle is placed through the roast 30. Thus, the cord is passed longitudinally through the roast to facilitate better binding or tying of the roast. Before the roast is entirely removed from the machine, the cord is cut off at the back end of the machine (not shown) so that the desired length of cord remains for tying the roast.

When the roast is securely tied, the operator removes the knob 17 from back plate 15, which releases the plate from the needle and from the roast. The plate is removed, and the roast is removed from the needle.

It is to be understood that various modifications of the illustrated embodiment may be made which do not depart from the true spirit and scope of the appended claims. These may include forming the machine into a multiple battery of devices for simultaneous forming of a plurality of roasts. The machine may be power operated, as well as manually, or various modifications to the means of securing the back plate to the casing may be made.

I claim:

1. A method of compressing meat for forming a roast comprising the steps of placing meat in a tubular casing against a plate advancing a front plate against said meat in said casing, passing a needle longitudinally through said meat, holding the needle in position with respect to said plates by a suitable means, and removing said meat, said plates and needle together from said casing for tying said meat.

2. A method of compressing meat for forming a roast according to claim 1, including placing two or more pieces of meat between the plates, and placing a cord longitudinally in said meat for tying said meat longitudinally.

References Cited in the file of this patent

UNITED STATES PATENTS

| | | |
|---|---|---|
| 234,983 | Hoefjen | Nov. 30, 1880 |
| 584,322 | Bryson | June 15, 1897 |
| 2,625,876 | Hammerberg | Jan. 20, 1953 |

FOREIGN PATENTS

| | | |
|---|---|---|
| 23,987 | Great Britain | Nov. 14, 1898 |